(12) United States Patent
Plondke et al.

(10) Patent No.: US 8,601,234 B2
(45) Date of Patent: Dec. 3, 2013

(54) CONFIGURABLE TRANSLATION LOOKASIDE BUFFER

(75) Inventors: Erich James Plondke, Austin, TX (US); Ajay Anant Ingle, Austin, TX (US); Lucian Codrescu, Austin, TX (US); Paul Bassett, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 1105 days.

(21) Appl. No.: 11/936,269

(22) Filed: Nov. 7, 2007

(65) Prior Publication Data

US 2009/0119477 A1 May 7, 2009

(51) Int. Cl.
*G06F 12/00* (2006.01)

(52) U.S. Cl.
USPC .................. 711/207; 711/205; 711/E12.002

(58) Field of Classification Search
USPC .................................. 711/207, E12.002, 205
See application file for complete search history.

(56) References Cited

U.S. PATENT DOCUMENTS

| 4,068,303 | A | * | 1/1978 | Morita ........................... 711/207 |
| 5,708,790 | A | * | 1/1998 | White et al. .................... 711/203 |
| 6,684,298 | B1 | | 1/2004 | Dwarkadas et al. |
| 6,834,328 | B2 | * | 12/2004 | Dwarkadas et al. .......... 711/128 |
| 6,886,093 | B2 | * | 4/2005 | Henry et al. .................. 712/239 |
| 7,788,513 | B2 | * | 8/2010 | Vaden et al. ................... 713/320 |
| 2003/0226123 | A1 | * | 12/2003 | Thompson et al. ............... 716/4 |
| 2005/0160250 | A1 | * | 7/2005 | Yoshimi ........................ 711/207 |
| 2006/0190707 | A1 | * | 8/2006 | McIlvaine et al. ............ 712/219 |
| 2006/0259732 | A1 | * | 11/2006 | Traut et al. .................... 711/173 |

FOREIGN PATENT DOCUMENTS

| GB | 2304215 | 3/1997 |
| KR | 20030010727 | 2/2003 |

OTHER PUBLICATIONS

Delaluz V et al: "Reducing DTLB Energy Through Dynamic Resizing" Proceedings 2003 IEEE International Conference on Computer Design: VLSI in Comuters and Processors. ICCD 2003. San Jose, CA, Oct. 13-15, 2003; [International Conference on Computer Design], Los Alamitos, CA, IEEE Comp. Soc, US, (Oct. 13, 2003), pp. 358-363.
International Search Report—PCT/US08/082857, International Search Authority—European Patent Office—Feb. 5, 2009.
Written Opinion—PCT/US08/082857, International Search Authority—European Patent Office—Feb. 5, 2009.

* cited by examiner

*Primary Examiner* — Reginald Bragdon
*Assistant Examiner* — Baboucarr Faal
(74) *Attorney, Agent, or Firm* — Peter Michael Kamarchik; Nicholas J. Pauley; Joseph Agusta

(57) ABSTRACT

The disclosure includes a method and system of configuring a translation lookaside buffer (TLB). In an embodiment, the TLB includes a first portion and a second portion. The first portion or the second portion may be selectively disabled in response to a value of a TLB configuration indicator.

29 Claims, 5 Drawing Sheets

CONFIGURABLE TRANSLATION LOOKASIDE BUFFER

I. FIELD

The present disclosure is generally related to translation lookaside buffers.

II. DESCRIPTION OF RELATED ART

Advances in technology have resulted in smaller and more powerful personal computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and IP telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Processes that are executed at a portable computing device may reference data and instructions using virtual addresses that must be translated to physical addresses for processing. Translation lookaside buffers (TLBs) can store data for quickly translating virtual addresses to physical addresses and can improve application performance by reducing delays associated with translating virtual addresses. However, power consumption can also be increased by operation of a TLB. Increased power consumption can cause a corresponding decrease in an operating time of a portable personal computing device before battery replacement or recharging is required.

III. SUMMARY

In a particular embodiment, a method is disclosed that includes receiving at least one translation look-aside buffer (TLB) configuration indicator. The method also includes modifying a number of searchable entries of a TLB in response to a value of the TLB configuration indicator.

In another particular embodiment, a method is disclosed that includes determining a translation lookaside buffer (TLB) miss rate. The method includes detecting that the TLB miss rate exceeds a threshold. The method further includes sending an instruction to increase a TLB size after detecting that the TLB miss rate has exceeded the threshold.

In another particular embodiment, a system is disclosed that includes a translation lookaside buffer (TLB) configuration bit stored in a memory. The system also includes a TLB including a first portion and a second portion. The first portion is selectively disabled in response to a value of the TLB configuration bit.

In another particular embodiment, a computer readable media is disclosed. The computer readable media includes a configuration register that includes a first field and a second field. The second field includes a translation lookaside buffer (TLB) configuration value. The TLB configuration value identifies a first setting or a second setting. When the TLB configuration value identifies the first setting, the TLB has a first number of searchable entries and when the value identifies the second setting, the TLB has a second number of searchable entries.

One particular advantage provided by the disclosed embodiments is reduced power consumption that is enabled by selectively disabling a number of searchable TLB entries.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
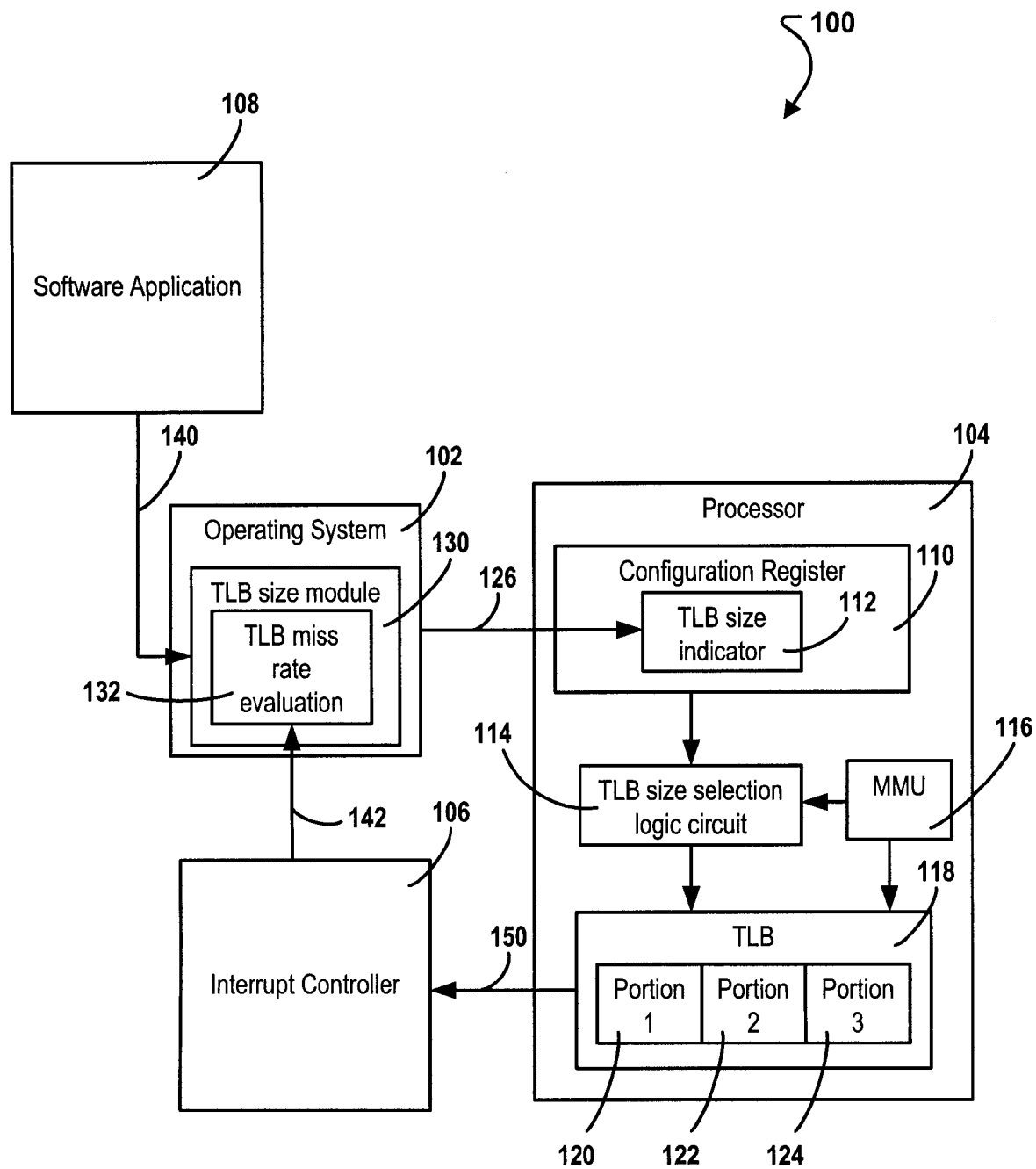
FIG. 1 is a functional diagram of a particular illustrative embodiment of a system including a configurable translation lookaside buffer (TLB)

Referring to FIG. 1, a particular illustrative embodiment of a system including a configurable TLB is depicted and generally designated 100. The system 100 includes an operating system 102, a processor 104, an interrupt controller 106, and a software application 108. The operating system 102 is responsive to input from the software application 108 and input from the interrupt controller 106. The processor 104 is responsive to the operating system 102 and provides an interrupt output that is provided to the interrupt controller 106.

In a particular embodiment, the processor 104 includes a configuration register 110 that includes multiple configuration fields, including a TLB size indicator 112. The processor 104 also includes a translation lookaside buffer (TLB) size selection logic circuit 114 that is responsive to the configuration register 110 and to a memory management unit (MMU) 116. The processor 104 further includes a TLB 118 that is responsive to the TLB size selection logic circuit 114 and to the MMU 116.

In a particular embodiment, the processor 104 is operable to control a number of searchable entries that are available at the TLB 118. The processor 104 may be configured to receive an instruction via a signal 126 from the operating system 102 and to update a value of the TLB size indicator 112 in response to the instruction 126. The TLB size selection logic 114 may be adapted to provide an output to the TLB 118 based on the value of the TLB size indicator 112 and based on input received from the MMU 116.

The TLB 118 includes at least two portions, such as a first portion 120, a second portion 122, and a third portion 124, as illustrated. In a particular embodiment the TLB 118 includes a first portion and a second portion. In another embodiment, the TLB 118 includes a first portion, a second portion, a third portion, and a fourth portion. It should be understood that the TLB 118 may include multiple portions and may include more than four portions, depending on a particular application and system design constraints.

Each TLB portion 120-124 includes one or more TLB entries to store data for translating virtual addresses to physical addresses. In a particular embodiment, the TLB 118 is software programmable such that each of the entries of the TLB 118 may be populated by a software program. In addition, one or more of the TLB portions 120-124 are configured to be selectively disabled or enabled based on the output of the TLB size selection logic circuit 114. In a particular embodiment, the processor 104 is configured to send a TLB miss signal 150 to the interrupt controller 106 when a virtual address to be translated does not match any entry of the enabled TLB portions 120-124.

In a particular embodiment, the interrupt controller 106 is adapted to receive one or more TLB miss signals 150 and to initiate interrupt or exception handling in response to each of the TLB miss signals. The interrupt controller 106 may be configured to provide a control output 142 to the operating system 102 in response to received TLB miss signals 150.

In a particular embodiment, the operating system 102 includes a TLB size module 130 that is executable to determine a selected size of the TLB 118 based on data received from one or more software applications 108, from the interrupt controller 106, or any combination thereof. The TLB size module 130 may include a TLB miss rate evaluation module 132 that is executable to evaluate a TLB miss rate based on the control output 142 from the interrupt controller 106 that provides TLB miss data. In a particular embodiment, the operating system 102 is configured to automatically monitor and update a TLB size, a number of enabled TLB portions 120-124, or a number of TLB entries, of the TLB 118 based on the determined TLB miss rate.

In an illustrative embodiment, the processor 104 is an interleaved multithreaded pipelined processor. The configuration register 110 and the TLB 118 may be shared between different processing threads of the processor 104. The operating system 102 may be adapted to support multithreaded processing at a wireless communication device. In a particular embodiment, the operating system 102 is a LINUX™-type operating system.

During operation, the operating system 102 may receive one or more inputs 140 from one or more software applications 108 that designate TLB configuration parameters. As an illustrative, non-limiting example, the inputs 140 may indicate a number of TLB entries required or preferred by each software application 108. The operating system 102 may also receive TLB miss information from the interrupt controller 106 or other device and may determine a TLB miss rate at the TLB miss rate evaluation module 132. Each TLB miss, which occurs when the TLB 118 receives a query for a translation of a virtual address that is not stored at an searchable entry of the TLB, causes a processing delay while the physical address corresponding to the particular virtual address is located by searching a page table (not shown) and then loaded into an entry of the TLB 118. The TLB miss rate may indicate a percentage of TLB queries that result in TLB misses, a ratio of TLB misses to non-TLB misses (i.e., TLB "hits"), a number of TLB misses per unit time, or other information reflecting TLB performance.

The operating system 102 may determine a TLB size setting at the TLB size module 130 based on the data received from the software applications 108, the TLB miss rate data, or any combination thereof. In a particular embodiment, the operating system 102 communicates the determined TLB size setting to the processor 104 via the signal 126.

For example, in an illustrative embodiment, the TLB size module 130 receives an indication of a number of TLB entries from the one or more software applications 108 and may determine a number of TLB portions that are enabled to provide a sufficient number of TLB entries for the software application 108 to execute with an acceptably low number of processing delays due to TLB misses. The TLB size module 130 may also compare TLB miss rate data received from the TLB miss rate evaluation module 132 to one or more thresholds. For example, if the TLB miss rate exceeds an upper threshold, the TLB size module 130 may determine that one or more additional TLB portions 120-124 should be enabled to reduce the TLB miss rate and to improve processing performance. However, if the TLB miss rate is beneath a lower threshold, the TLB size module 130 may determine that one or more TLB portions 120-124 should be disabled to reduce power consumption without significantly degrading performance due to increased TLB misses.

In a particular embodiment, the signal 126 generated by the operating system 102 includes an instruction to set a value of the TLB size indicator 112. In an illustrative embodiment, the operating system 102 instructs the processor 104 to increment or decrement the number of enabled TLB portions 120-124. In another embodiment, the operating system 102 instructs the processor 104 to enable a specific number of TLB portions 120-124 or designates specific TLB portions 120-124 to be enabled. In a particular embodiment, the operating system 102 instructs the processor 104 to write a specific value to the TLB size indicator 112.

As an illustrative example, in an embodiment where the TLB 118 includes only two portions, a first TLB portion may always be enabled, and the TLB size indicator 112 may be a single bit value. The operating system 102 may instruct the processor 104 to write a logical "1" value to the TLB size indicator 112 to disable the second TLB portion or write a logical "0" value to the TLB size indicator 112 to enable the second TLB portion. As another example, in an embodiment where the TLB 118 includes more than two TLB portions, the operating system 102 may instruct the processor 104 to program a value to the TLB size indicator 112 that is a binary representation of a number of TLB portions to be enabled. To illustrate, the TLB size indicator 112 may include two bits indicating four settings, with each setting relating to a different number of enabled TLB portions, and consequently a different number of searchable TLB entries. As another example, the TLB size indicator 112 may include a dedicated bit for each TLB portion for selective enabling or disabling of specific TLB portions by the operating system 102.

In response to the setting of the TLB size indicator 112, the TLB size selection logic circuit 114 provides a command signal to the TLB 118. Based on the command signal from the TLB size selection logic circuit 114 and also based on input from the MMU 116, the TLB 118 is configured to use one or more of the TLB portions, such as the indicated TLB portions 120-124, during operation. When the command signal from the TLB size selection logic 114 indicates that less than all TLB portions 120-124 are to be used, the TLB 118 may deactivate and optionally power down the disabled or unused TLB portions to conserve power and resources of the processor 104.

In an embodiment, the first TLB portion 120 may be selectively disabled in response to a value of a TLB configuration bit stored in a memory, such as one or more bits within the TLB size indicator 112 stored in the configuration register 110. The processor 104 includes a logic element, such as the TLB size selection logic circuit 114, that is responsive to an input coupled to the memory. The logic element has an output coupled to the TLB 118, and any of the TLB portions 120, 122, and 124 may be selectively disabled in response to the output of the logic element. In a particular embodiment, the first TLB portion 120 may include half of the entries in the TLB 118. In another embodiment, the first TLB portion 120 may include one-third, one-fourth, or any other portion of the entries in the TLB 118. Further, the first TLB portion 120 may be the same size or a different size than the second TLB portion 122.

The system 100, including the software application 108, may be used in various modes of operation. In a first mode of operation, the software application 108 may require only a single TLB entry for purposes of execution. In this first mode of operation, the software application 108 may direct the operating system 102 to set the TLB size indicator 112 within the configuration register 110 such that only a single entry (or a single portion) in the TLB 118 is used. In this first mode of operation, the software application 108 may execute normally and the TLB 118 may be used in a low power and efficient manner because only a single entry in the TLB 118 is utilized. An example of a software application 108 that may be configured to use a single entry of the TLB 118 is a Moving Picture Experts Group (MPEG)-1 Audio Layer 3 (MP3)-type application.

In a second mode of operation, the software application 108 may require a plurality of TLB entries and may even require that all entries of the TLB 118 are utilized. In this second mode of operation, a plurality of TLB entries are enabled, and all TLB entries may be enabled, depending on the performance requirements of the software application 108. It should be understood that the software application 108 includes program code that is executable by the processor 104 and that the software application 108 is illustrated separately for exemplary and illustrative purposes only.

Figure 2:
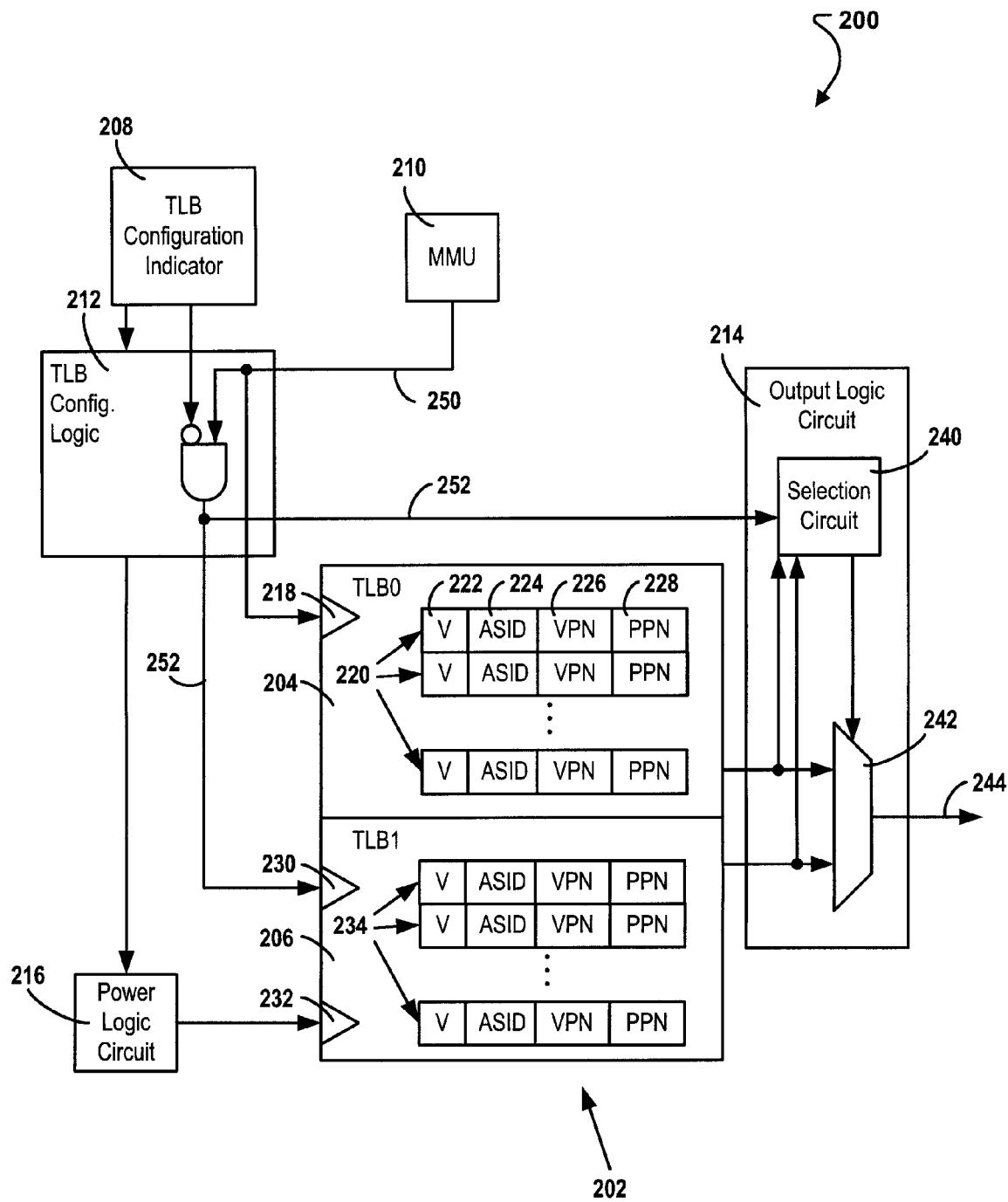
FIG. 2 is a functional diagram of a second illustrative embodiment of a system including a configurable TLB.

Referring to FIG. 2, a second particular embodiment of a system including a configurable TLB is depicted and generally designated 200. In a particular embodiment, the system 200 illustrates a portion of the system 100 of FIG. 1. The system 200 includes a translation lookaside buffer (TLB) 202, a TLB configuration indicator 208, a memory management unit (MMU) 210, TLB configuration logic 212, an output logic circuit 214, and a power logic circuit 216. The TLB configuration logic 212 is coupled to receive input from the TLB configuration indicator 208 and the MMU 210. In a particular embodiment, the TLB configuration indicator 208 is the TLB size indicator 112 of FIG. 1. The TLB configuration logic 212 is coupled to provide output control signals to the power logic circuit 216 and to the TLB 202. The TLB 202 is coupled to provide a plurality of outputs to the output logic circuit 214, which in turn is configured to generate an output 244.

The TLB 202 includes a first representative portion 204 and a second representative portion 206. The first representative portion 204 includes a first plurality of entries 220. Each of the first plurality of entries 220 includes a first valid field 222, an address space identifier (ASID) field 224, a virtual page number (VPN) field 226, and a physical page number (PPN) field 228. Similarly, the second representative portion 206 of the TLB 202 includes a second plurality of entries 234.

The first representative portion 204 also includes a first enable input 218 that is responsive to the TLB configuration logic 212 to selectively enable or disable searching of the first plurality of entries 220. The second representative portion 206 includes a second enable input 230 that is responsive to the TLB configuration logic 212 to selectively enable or disable searching of the second plurality of entries 234.

In addition, the second representative portion 206 of the TLB 202 includes a power input 232 that is responsive to the power logic circuit 216 to selectively activate or deactivate power to the second representative portion 206. Although not shown, in a particular embodiment the first representative portion 204 may also include an input responsive to the power logic circuit 216 to selectively activate or deactivate power to the first representative portion 204 of the TLB 202.

The output logic circuit 214 includes a selection circuit 240 and a multiplexer 242. The multiplexer 242 is responsive to each of the plurality of outputs from the TLB 202. The selection circuit 240 is responsive to the TLB configuration logic 212 and controls the multiplexer 242 to selectively enable a selected entry of the TLB 202 as the resulting output 244.

During operation, the TLB configuration logic 212 receives input from the TLB configuration indicator 208 and from the MMU 210. The TLB configuration logic 212, based on the inputs received, generates output signals that are provided to the first enable input 218, the second enable input 230, the power logic circuit 216, and the output logic circuit 214.

One or more portions of the TLB 202, such as the illustrated portions 204 and 206, may be enabled or disabled dynamically based on output signals of the TLB configuration logic 212. When one or more of the TLB portions 204 and 206 are disabled, power to the disabled portion may also be turned off via the power logic circuit 216 to further conserve power resources. In addition, when one or more portions of the TLB 202 are disabled or deactivated, the output of those portions is invalid. Therefore, the selection circuit 240 within the output logic circuit 214 is configured to control the multiplexer 242 to mask off invalid output signals from disabled portions of the TLB 202 by disabling selection of the deactivated portion via the multiplexer 242, such that the resulting output 244 only may propagate valid selected entries of the TLB 202 that are in an active state. As such, in a particular embodiment, the multiplexer 242 is responsive to outputs of the TLB 202 and also selects the outputs of the TLB 202 that are enabled in response to a configuration bit setting within a configuration register as indicated by the TLB configuration logic 212. In another embodiment where the output of disabled portions of the TLB 202 is constrained to a particular value, such as a logical "0" value or a high-impedance state, the output logic circuit 214 may not include the selection logic 240 that is responsive to the TLB configuration logic 212 and may instead include other output selection logic, such as a node configured to dynamically select only active outputs of the TLB 202.

In a particular illustrative embodiment, the first representative portion 204 includes 32 entries 220 and the second representative portion 206 includes 32 entries 234. The TLB configuration indicator 208 may be configured so that a default logical "0" value indicates that all 64 TLB entries 220 and 234 are to be enabled for searching, and that a logical "1" value indicates that only a first 32 entries 220 (entries in the first portion 204) are to be enabled for searching. The MMU 210 may be configured to provide a logical "1" at an output 250 when a TLB search is to be performed and to provide a logical "0" otherwise. The TLB configuration logic 212 may generate an output 252 that is a logical "1" when the MMU output 250 is "1" and the TLB configuration indicator 208 is "0", such as via an output of an AND element having the TLB configuration indicator 208 coupled to an inverting input and the MMU output 250 coupled to a second input.

In a particular illustrative embodiment, when the TLB configuration indicator 208 is reset from a default "0" value (e.g., 64 searchable entries) to "1" (e.g., 32 searchable entries), steps may be performed such that any valid entries in the second representative portion 206 are transferred to the first representative portion 204 prior to disabling the second representative portion 206. For example, all valid entries in the second representative portion 206, such as those entries having a "1" in the corresponding valid field 222, may be copied to an unused entry of the first representative portion 204. Similarly, when the TLB configuration indicator 208 is reset from "1" to "0", the valid field 222 of each of the entries 234 of the second representative portion 206 may be set to "0" to indicate that the newly-enabled entry is invalid. Such operations may be controlled by hardware, software, or any combination thereof.

Figure 3:
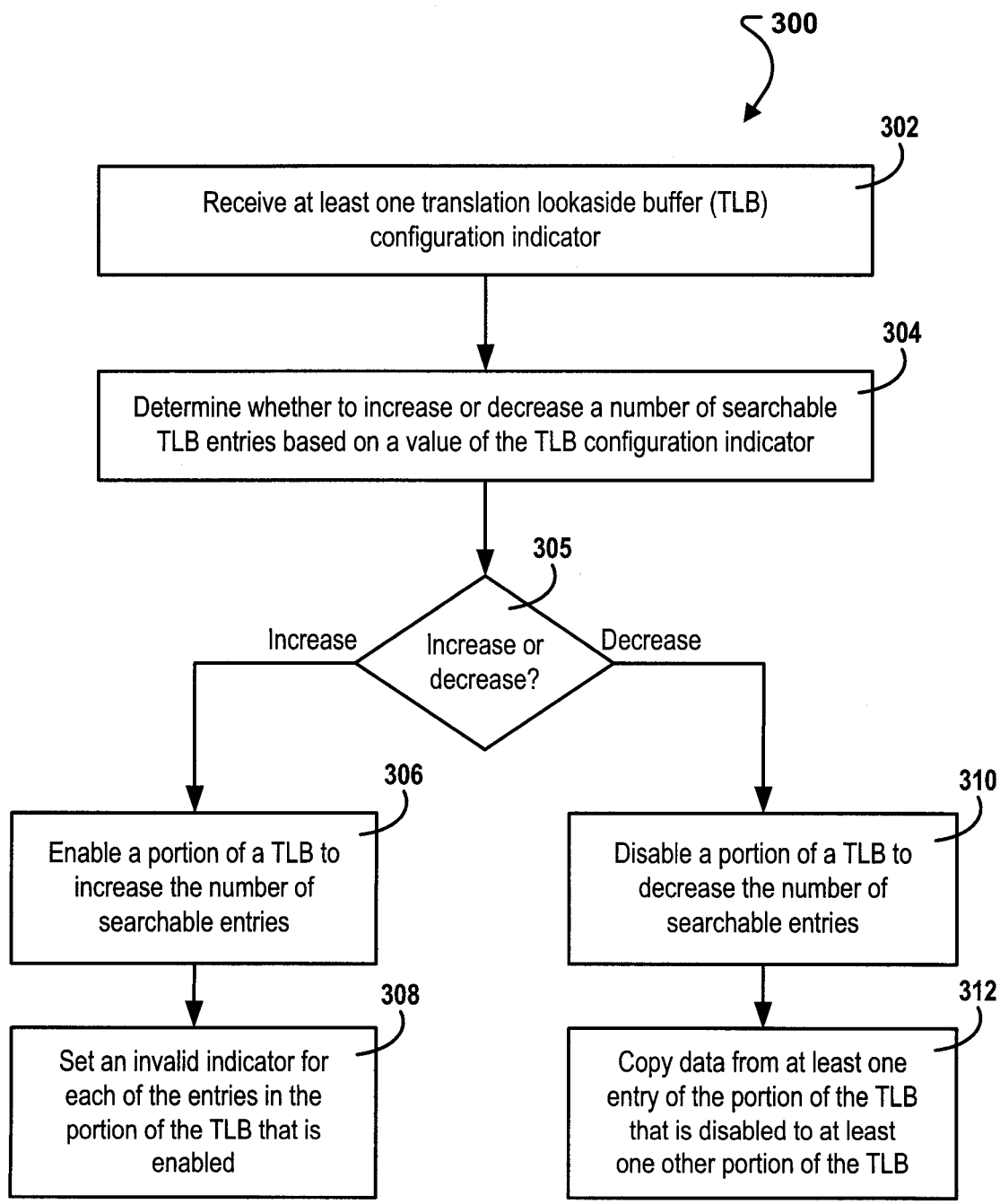
FIG. 3 is a flow chart of a particular illustrative embodiment of a method of configuring a TLB.

Referring to FIG. 3, a particular illustrative embodiment of a method of configuring a TLB is depicted and generally designated 300. With the method, at least one translation lookaside buffer (TLB) configuration indicator is received, at 302. In a particular embodiment, the TLB configuration indicator is received at a processor that includes a configurable TLB, such as the processor 104 of FIG. 1. The TLB configuration indicator may be received at the processor from an operating system, such as the operating system 102 of FIG. 1. The TLB configuration indicator may be determined in response to a TLB miss rate exceeding a threshold, in response to a software application, in response to one or more other events relating to address translation, or any combination thereof. In a particular embodiment, the TLB configuration indicator determines whether the TLB has a first number of available entries or a second number of available entries.

A determination may be made whether to increase or decrease a number of searchable TLB entries based on a value of the TLB configuration indicator, at 304. In a particular embodiment, the determination may be made by comparing one or more bit values of a TLB size field of a processor configuration register to a current TLB configuration. In an illustrative embodiment, the determination may be made by the TLB size selection logic circuit 114 of FIG. 1.

In a particular embodiment, when the number of searchable TLB entries is to be increased, at decision step 305, a portion of the TLB may be enabled to increase the number of searchable entries, at 306. In a particular embodiment, the portion of the TLB that is newly enabled may store data from a previous operating period before the TLB portion was disabled, and thus the data of the newly-enabled entries may not be reliable. An invalid indicator may therefore be set for each of the entries in the portion of the TLB that is enabled, at 308. In an illustrative embodiment, the TLB may be the TLB 202 of FIG. 2, and the invalid indicator may be a "0" bit value stored in the valid field 222 of each TLB entry.

Alternatively, where the number of searchable TLB entries is to be decreased, at decision step 305, a portion of the TLB may be disabled to decrease the number of searchable entries, at 310. As an illustrative example, the disabling operation may include rendering a selected portion of the TLB unavailable for searching without powering off the TLB. In another embodiment, the selected portion of the TLB may be powered off after being disabled. For example, when the TLB size is to be reduced in response to a low TLB miss rate, a selected portion of the TLB may remain disabled for a period of time to ensure a new TLB miss rate is acceptable before powering off the disabled portion of the TLB. In another embodiment, disabling the portion of the TLB may include powering off the portion of the TLB.

In a particular embodiment, the portion of the TLB that is to be disabled may include address translation data associated with one or more continuing processes that should be retained at the TLB. Data may be copied from at least one entry of the portion of the TLB that is disabled to at least one other portion of the TLB, as shown at 312. In this manner, data from disabled portions of the TLB may be preserved for future use.

Figure 4:
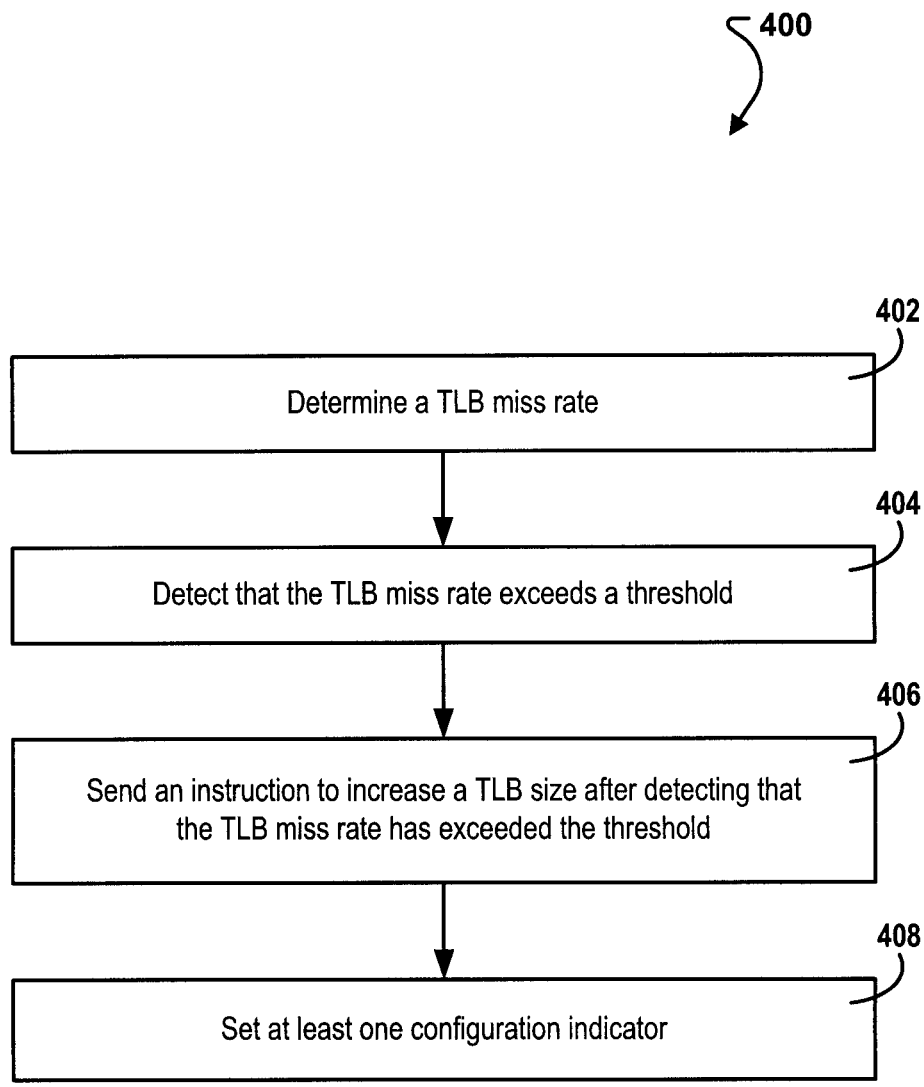
FIG. 4 is a flow chart of a second illustrative embodiment of a method of configuring TLB.

Referring to FIG. 4, an illustrative embodiment of a method of using a configurable TLB is depicted and generally designated 400. In a particular embodiment, the method 400 may be performed by the operating system 102 of FIG. 1. The method includes determining a TLB miss rate, at 402. In a particular embodiment, the TLB miss rate is based on a number of attempted TLB queries that result in an exception as compared to a total number of TLB queries. In an illustrative embodiment, the TLB miss rate may be determined using data from an interrupt controller that receives interrupts generated in response to TLB misses.

Continuing to 404, the TLB miss rate is detected to exceed a threshold. Advancing to 406, an instruction to increase a TLB size is sent after detecting that the TLB miss rate has exceeded the threshold. In an illustrative embodiment, the instruction may be sent to a processor that includes a configurable TLB, such as the processor 104 of FIG. 1.

Proceeding to 408, in a particular embodiment, at least one configuration indicator is set at configuration register to indicate a number of enabled portions of a TLB. In an illustrative embodiment, the at least one configuration indicator includes one or more bits of a TLB size indicator field, such as the TLB size indicator field 112 of FIG. 1. The at least one configuration indicator may be set in response to an instruction, such as in response to the signal 126 sent from the operating system 102 of FIG. 1.

Figure 5:
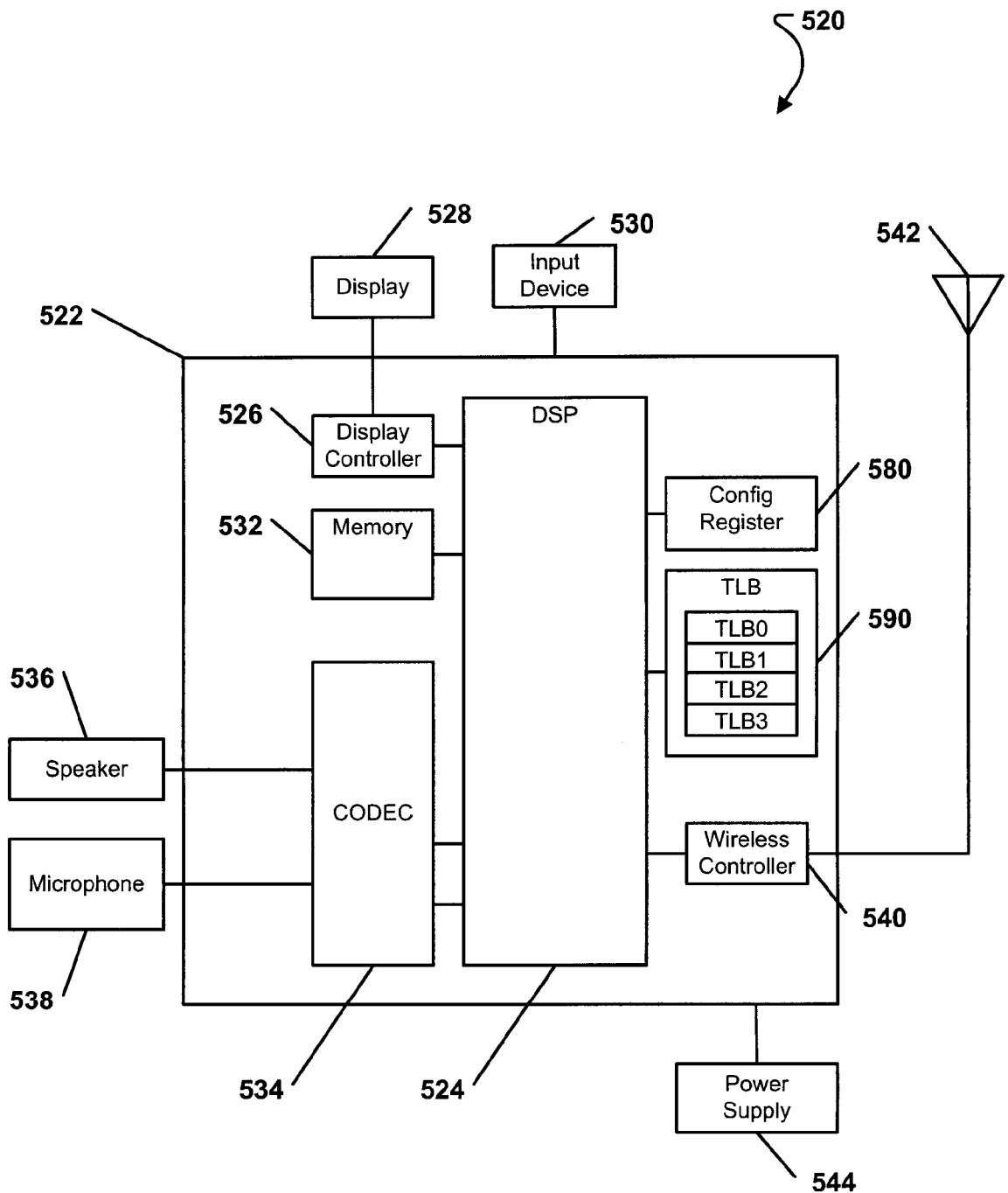
FIG. 5 is a block diagram of a portable communication device including a configurable TLB.

FIG. 5 illustrates an exemplary, non-limiting embodiment of a portable communication device that includes a configurable TLB and that is generally designated 520. As illustrated in FIG. 5, the portable communication device 520 includes an on-chip system 522 that includes a digital signal processor 524 and a configuration register 580. In a particular illustrative embodiment, the configuration register 580 includes one or more indicators to determine a number of searchable entries at a translation lookaside buffer (TLB) 590. The TLB 590 includes multiple TLB portions that may be selectively enabled or disabled in accordance with system demands and power usage considerations. In a particular embodiment, the configuration register 580 and the TLB 590 may be components of the digital signal processor 524. In an illustrative embodiment, the TLB 590 and the configuration register 580 may operate substantially as disclosed with respect to the TLB 118 and the configuration register 110 of FIG. 1.

FIG. 5 also shows that a display controller 526 is coupled to the digital signal processor 524 and to a display 528. A memory 532 is also coupled to the digital signal processor 524. Additionally, a coder/decoder (CODEC) 534 can be coupled to the digital signal processor 524. A speaker 536 and a microphone 538 can be coupled to the CODEC 534.

FIG. 5 also indicates that a wireless controller 540 can be coupled to the digital signal processor 524 and coupled to a wireless antenna 542. In a particular embodiment, an input device 530 and a power supply 544 are coupled to the on-chip system 522. Moreover, in a particular embodiment, as illustrated in FIG. 5, the display 528, the input device 530, the speaker 536, the microphone 538, the wireless antenna 542, and the power supply 544 are external to the on-chip system 522. However, each is coupled to a component of the on-chip system 522.

In a particular embodiment, the digital signal processor 524 utilizes interleaved multithreading to process instructions associated with program threads to perform the functionality and operations needed by the various components of the portable communication device 520. For example, when a wireless communication session is established via the wireless antenna 542 a user can speak into the microphone 538. Electronic signals representing the user's voice can be sent to the CODEC 534 to be encoded. The digital signal processor 524 can perform data processing for the CODEC 534 to encode the electronic signals from the microphone. Further, incoming signals received via the wireless antenna 542 can be sent to the CODEC 534 by the wireless controller 540 to be decoded and sent to the speaker 536. The digital signal processor 524 can also perform data processing for the CODEC 534 when decoding the signal received via the wireless antenna 542.

Further, before, during, or after the wireless communication session, the digital signal processor 524 can process inputs that are received from the input device 530. For example, during the wireless communication session, a user may be using the input device 530 and the display 528 to surf the Internet via a web browser that is embedded within the memory 532 of the portable communication device 520. The digital signal processor 524 can interleave various program threads that are used by the input device 530, the display controller 526, the display 528, the CODEC 534 and the wireless controller 540 to efficiently control the operation of the portable communication device 520 and the various components therein. Many of the instructions associated with the various program threads are executed concurrently during one or more clock cycles. As such, the power and energy consumption due to wasted clock cycles is substantially decreased.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined by the following claims.

What is claimed is:

1. A method comprising:
   receiving at least one translation lookaside buffer (TLB) configuration indicator, wherein the at least one TLB configuration indicator specifies a value corresponding to a number of entries to be enabled at a TLB; and
   modifying a number of searchable entries of the TLB in response to the value of the at least one TLB configuration indicator.

2. The method of claim 1, wherein the at least one TLB configuration indicator is received from an operating system.

3. The method of claim 1, wherein the at least one TLB configuration indicator includes data in a configuration register.

4. The method of claim 1, wherein modifying the number of searchable entries includes enabling a portion of the TLB to increase the number of searchable entries.

5. The method of claim 4, further comprising setting an invalid indicator for each of the searchable entries in the portion of the TLB that is enabled, wherein the invalid indicator indicates that each of the searchable entries in the portion of the TLB that is enabled may store invalid data.

6. The method of claim 1, wherein the at least one TLB configuration indicator is used to determine whether the TLB has a first number of available entries or a second number of available entries after the number of searchable entries of the TLB is modified.

7. The method of claim 1, further comprising:
   disabling a portion of the TLB to decrease the number of searchable entries.

8. The method of claim 7, further comprising:
   copying data from at least one entry of the portion of the TLB that is disabled to at least one other portion of the TLB.

9. The method of claim 7, further comprising powering off the portion of the TLB that is disabled.

10. A method comprising: receiving a translation lookaside buffer (TLB) configuration indicator; disabling a portion of a TLB in response to a value of the TLB configuration indicator indicating a specific number of TLB entries to be disabled; wherein disabling includes blocking signaling to the disabled portion of the TLB; supplying power to the disabled portion of the TLB for a period of time and powering off the disabled portion of the TLB after the period of time.

11. The method of claim 10, wherein a power logic circuit powers off the disabled portion of the TLB, and wherein disabling further includes deselecting output signals corresponding to TLB entries of the disabled portion of the TLB using a multiplexor (MUX).

12. The method of claim 10, further comprising, after disabling the disabled portion of the TLB, determining a new TLB miss rate associated with the TLB prior to powering off the disabled portion of the TLB, wherein the disabled portion of the TLB is powered off in response to the new TLB miss rate associated with the TLB.

13. The method of claim 10, further comprising, after powering off the disabled portion of the TLB, comparing the TLB configuration indicator to a current configuration of the TLB, wherein the TLB configuration indicator is based on a requested number of TLB entries associated with a software application.

14. A memory device comprising:
   a configuration register that includes a translation lookaside buffer (TLB) configuration field including a TLB configuration value specifying a value corresponding to a number of searchable entries to be enabled at a TLB, wherein the TLB configuration value identifies a first setting or a second setting and wherein when the TLB configuration value identifies the first setting, the TLB has a first number of searchable entries and when the TLB configuration value identifies the second setting, the TLB has a second number of searchable entries, the second number differing from the first number.

15. The memory device of claim 14, wherein the TLB configuration field is programmable by a processor under software control.

16. The memory device of claim 15, wherein the software control is performed by an operating system.

17. The memory device of claim 14, wherein the TLB configuration field has at least two bits and wherein the value is configured to further identify a third setting or a fourth setting, the third setting related to a third number of searchable entries of the TLB and the fourth setting related to a fourth number of searchable entries of the TLB.

18. A system comprising:
a translation lookaside buffer (TLB) configuration value stored in a memory, wherein the TLB configuration value indicates a specific number of TLB entries to be enabled or disabled; and
a TLB including a first portion having a first number of TLB entries and a second portion having a second number of TLB entries, wherein the first portion is selectively disabled in response to the TLB configuration value, wherein disabling includes blocking signaling to the disabled portion of the TLB, and wherein the first portion is powered off after being disabled.

19. The system of claim 18, further comprising a logic element responsive to the memory, the logic element having an output coupled to the TLB, wherein the first portion is selectively disabled in response to the output of the logic element.

20. The system of claim 19, wherein the logic element is further responsive to a memory management unit control signal.

21. The system of claim 18, wherein the first portion includes one half of the TLB entries in the TLB.

22. The system of claim 18, wherein the first portion includes a different number of TLB entries than the second portion.

23. The system of claim 18, further comprising a multiplexer responsive to outputs of the TLB, wherein the multiplexer is configured to select output signals corresponding to TLB entries that are enabled in response to the TLB configuration value, and further comprising a logic circuit coupled to the TLB, wherein the logic circuit is configured to power off TLB entries that are disabled in response to the TLB configuration value.

24. The system of claim 18, wherein a plurality of TLB entries in the TLB are populated by a software program.

25. The system of claim 18, wherein the TLB is incorporated within a processor configured to execute a software application and wherein the software application has a mode of operating that uses a third number of TLB entries, wherein the third number of TLB entries is less than the first number of TLB entries.

26. A non-transitory computer-readable medium, including program code that, when executed by a processor, causes the processor to:
receive at least one translation lookaside buffer (TLB) configuration indicator, wherein the at least one TLB configuration indicator specifies a value corresponding to a number of entries to be enabled at a TLB; and
modify a number of searchable entries of the TLB in response to the value of the at least one TLB configuration indicator.

27. A non-transitory computer-readable medium, including program code that, when executed by a processor, causes the processor to: receive a translation lookaside buffer (TLB) configuration indicator; disable a portion of a TLB in response to a value of the TLB configuration indicator indicating a specific number of TLB entries to be disabled, wherein disabling includes blocking signaling to the disabled portion of the TLB; cause power to be supplied to the disabled portion of the TLB for a period of time and cause the disabled portion of the TLB to power off after the period of time.

28. An apparatus comprising:
means for storing translated addresses having a plurality of searchable entries; and
means for storing data that contains a configuration field including a configuration value specifying a value corresponding to a number of searchable entries to be enabled at the means for storing translated addresses,
wherein the configuration value identifies a first setting or a second setting and wherein when the configuration value identifies the first setting, the means for storing translated addresses has a first number of searchable entries and when the configuration value identifies the second setting, the means for storing translated addresses has a second number of searchable entries, the second number differing from the first number, and
wherein the means for storing data is distinct from the means for storing translated addresses.

29. An apparatus comprising:
means for storing data that contains a translation lookaside buffer (TLB) configuration value, wherein the TLB configuration value indicates a specific number of TLB entries to be enabled or disabled; and
means for storing translated addresses including a first portion having a first number of TLB entries and a second portion having a second number of TLB entries, wherein the first portion is selectively disabled in response to the TLB configuration value, wherein disabling includes blocking signaling to the disabled portion of the TLB, and wherein the first portion is powered off after being disabled.

* * * * *